US007216932B2

(12) United States Patent
Emmert

(10) Patent No.: US 7,216,932 B2
(45) Date of Patent: May 15, 2007

(54) HALF FOLD BELT TENSIONER

(75) Inventor: Erik Emmert, Ulm (DE)

(73) Assignee: Britax Romer Kindersicherheit GmbH, Ulm (DE)

( * ) Notice: Subject to any disclaimer, the term of this patent is extended or adjusted under 35 U.S.C. 154(b) by 0 days.

(21) Appl. No.: 10/981,059

(22) Filed: Nov. 4, 2004

(65) Prior Publication Data

US 2006/0091709 A1    May 4, 2006

(51) Int. Cl.
    *A47D 1/10* (2006.01)
(52) U.S. Cl. .............................. 297/256.16; 297/250.1
(58) Field of Classification Search ............... 297/254, 297/255, 256.16, 250.1, 464, 216.11
    See application file for complete search history.

(56) References Cited

U.S. PATENT DOCUMENTS

| 5,553,803 | A | | 9/1996 | Mitzkus et al. | |
|---|---|---|---|---|---|
| 6,017,088 | A | * | 1/2000 | Stephens et al. | 297/256.16 |
| 6,199,949 | B1 | * | 3/2001 | DaSilva | 297/256.12 |
| 6,508,510 | B2 | * | 1/2003 | Yamazaki | 297/250.1 |
| 6,540,293 | B1 | * | 4/2003 | Quackenbush | 297/256.13 |
| 2005/0156452 | A1 | * | 7/2005 | Biaud | 297/250.1 |
| 2005/0184567 | A1 | * | 8/2005 | Carpenter et al. | 297/256.16 |
| 2005/0275260 | A1 | * | 12/2005 | Patterson et al. | 297/256.16 |
| 2006/0006714 | A1 | * | 1/2006 | Van Geer et al. | 297/256.16 |

FOREIGN PATENT DOCUMENTS

| EP | 0732235 A2 | 9/1996 |
|---|---|---|
| EP | 0822115 A2 | 2/1998 |
| EP | 1077152 A2 | 2/2001 |
| EP | 1344678 A2 | 9/2003 |

* cited by examiner

*Primary Examiner*—David R. Dunn
*Assistant Examiner*—Sarah B. McPartlin
(74) *Attorney, Agent, or Firm*—Adams Evans P.A.

(57) ABSTRACT

A child safety seat having a base member for being mounted on a vehicle seat and secured in place in a conventional manner by lap and shoulder straps of the vehicle's adult seat belt. A child support in the child seat includes a squab attached to a base member and a back pivotally connected to the squab by a pivot axis. The base member has two L-shaped side members, each having a lap belt guide and a clampable shoulder belt guide between the pivot rod and upper bar.

14 Claims, 7 Drawing Sheets

HALF FOLD BELT TENSIONER

TECHNICAL FIELD AND BACKGROUND OF THE INVENTION

The present invention relates to a child safety seat for use in a vehicle, particularly though not exclusively a passenger vehicle.

As used herein, the term "squab" means the part of the seat which reacts to the user's weight.

The child safety seat with which the invention is concerned is of the type adapted to be secured to a vehicle's adult seat by its adult seat belt and comprises a child support as such, having a child support squab, a child support back, an actuating formation and strap deflecting means; a generally L shaped base adapted to rest on the vehicle seat and having a squab portion for resting on a squab of the adult seat with the support squab above it, a back portion for abutting against the back of the adult seat with the child support back in front of it and guide means defining a strap path for the adult seat belt; the arrangement being such that movement in a tightening direction of the actuating formation relative to the base causes movement of the strap deflecting means between a first position clear of the strap path and a second position in which a strap following the strap path is deflected therefrom, thereby tightening the strap.

applicant's prior European Patent No. 0822115 disclosed a seat of this type in which the actuating formation is integral with the seat assembly. Angular movement of the child support requires a relatively high force due to the friction between the strap and the strap deflecting means. In order to reduce this force, applicant's European Patent No. 1077152 disclosed a child safety seat of this type in which the strap deflecting means comprises a lever pivotally mounted on the base for angular movement about a transverse pivot axis, and the child support is coupled to the lever so that angular movement of the child support towards a normal use position causes angular movement of the lever to deflect the strap from the strap path.

SUMMARY OF THE INVENTION

Both of the above child safety seats require the entire child support to move relative to the base.

It is an object of the present invention to reduce the size, and therefore the weight, of the part of the child safety seat that has to be move in order to tighten the adult seat belt strap.

According to the invention, in a child safety seat of the type defined above, wherein a fixed one of the child support squab and the child support back is fixedly attached to the base member, the other, pivotal one is pivotally attached to the base member or to the fixed one, the projection is integrally formed with the pivotal one and means is provided for latching the pivotal one in its use position with the strap tensioned.

While it can be envisaged that the pivotal one is the child support squab; in the preferred embodiments, the pivotal one is the child support back. Further in the preferred embodiments, the child support back is pivotally attached to the child support squab.

Preferably the latching means is provided at a high position in the child support back and the back portion of the base.

In one embodiment, the actuating formation is integral with the strap deflecting means. In another, the actuating formation is arranged to engage with a separate strap deflecting member.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENT AND BEST MODE

Figure 1:
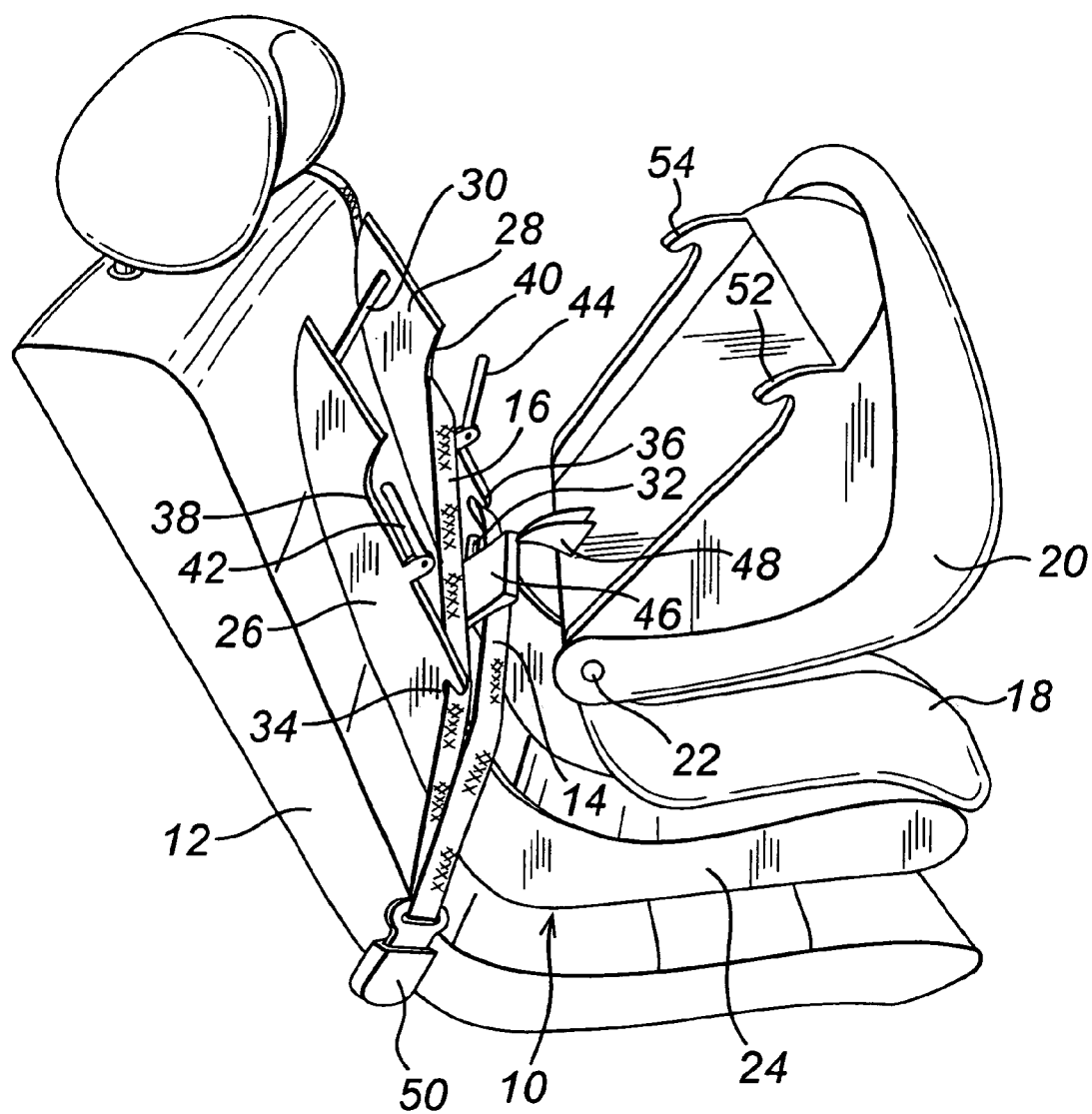
FIG. 1 is a perspective view from one side of a first child safety seat in accordance with the invention with the strap deflecting means in its disengaged position.
Figure 2:
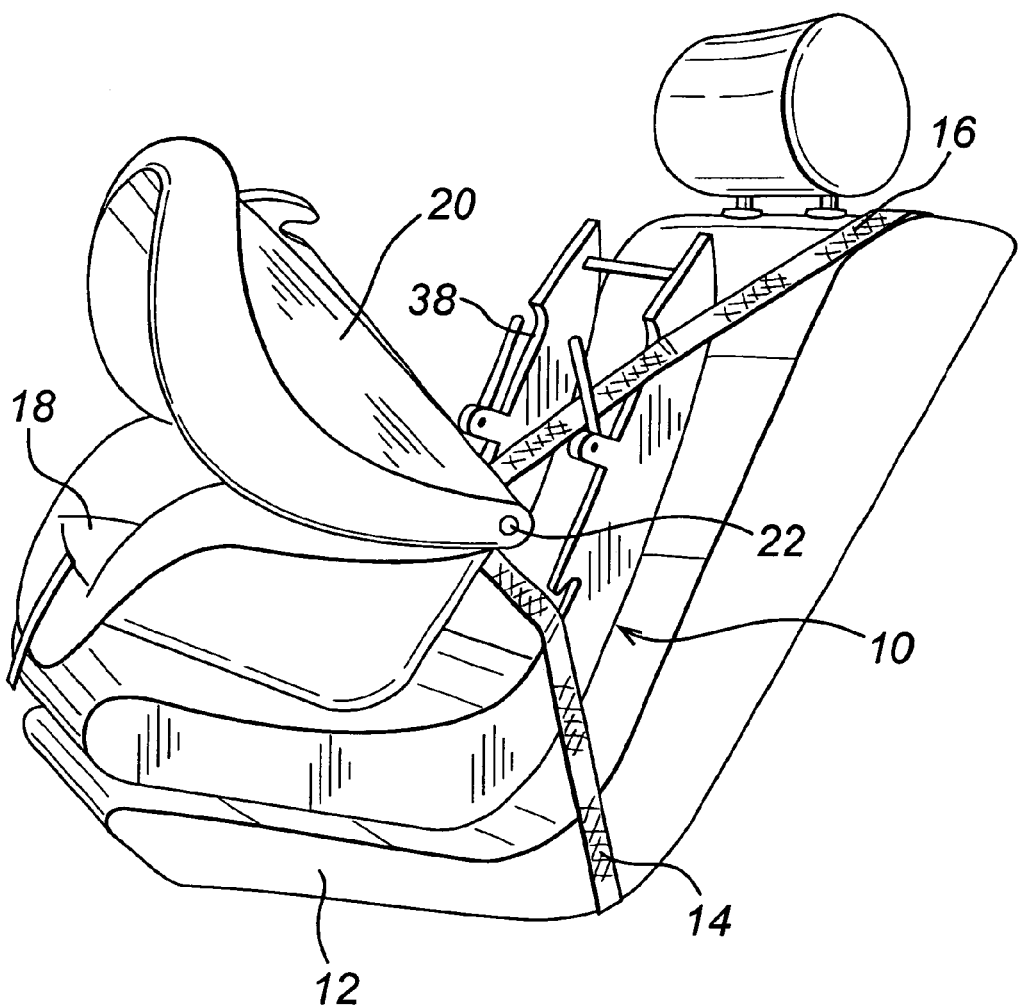
FIG. 2 is a perspective view of the seat shown in FIG. 1, from the opposite side.

Referring to FIGS. 1 and 2, a child safety seat of the invention comprises a base member 10 mounted on a vehicle seat 12 and secured in place by the lap and shoulder portions 14 and 16 of the strap of the vehicle's adult seat belt. A child support in the child seat comprises a child support squab 18, which is attached to the base member 10, and a child support back 20, which is pivotally connected to the squab 18 about by a pivot axis 22 and shown in a forward folded position.

The base member 10 consists of a central, generally horizontal squab portion 24, extending below the child support squab 18, and a back portion having two L-shaped side members 26 and 28, with feet integral with the squab portion 24 and stems extending upwardly from opposite sides of the squab portion 24. The side members 26 and 28 are interconnected both by an upper bar 30 and by a pivot rod 32. Each side member 26, 28 has a lap belt guide 34, 36 below the pivot axis 22 and a shoulder belt guide 38, 40 between the pivot rod 32 and the upper bar 30. Each shoulder belt guide 38, 40 incorporates a clamp 42, 44 for preventing movement of the adult seat belt relative to them once clamped. For the side of the car shown, the lap belt guides 34 and 36 and the shoulder belt guide 40 are engaged by the lap and shoulder straps 14 and 16 of the vehicle seat belt. The other shoulder belt guide 38 is provided for use when the child safety seat is used on the other side of the car.

A strap deflector 46 projects radially from its pivot rod 32 and is shown in FIG. 1 in a position just above the path of the lap strap 14 between the lap belt guides 34 and 36. A projection 48 extends rearwardly from the back of the child support back 20 to a position just above and in front of the strap deflector 46—in the folded forwards position of the back 20—so as to allow clearance for the lap strap 14 to pass therebetween as it is fitted round the lap belt guides 34 and 36.

Figure 3:
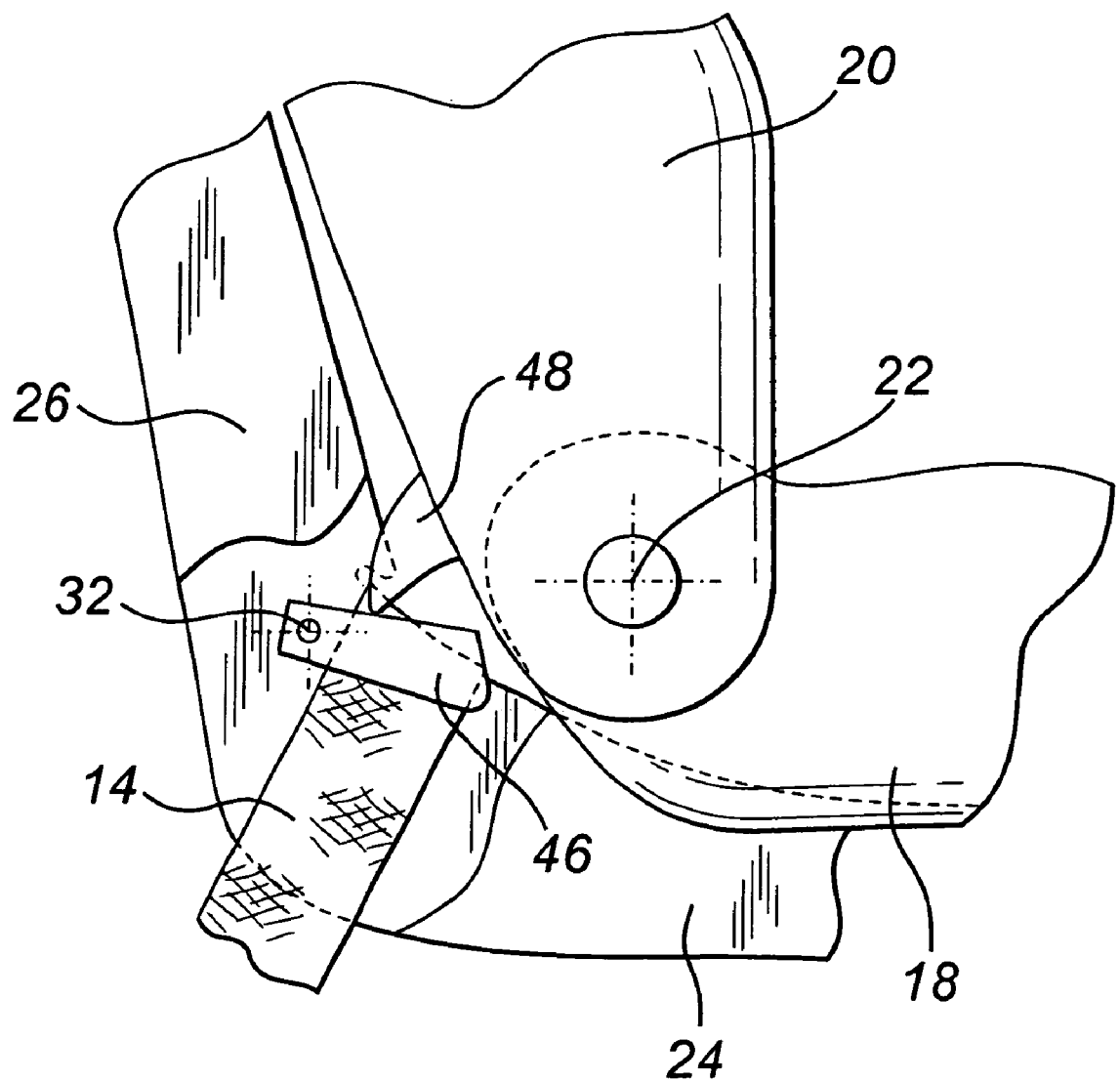
FIG. 3 is a fragmentary side view, corresponding to FIG. 2, but showing the strap deflecting means in its engaged position.
Figure 4:
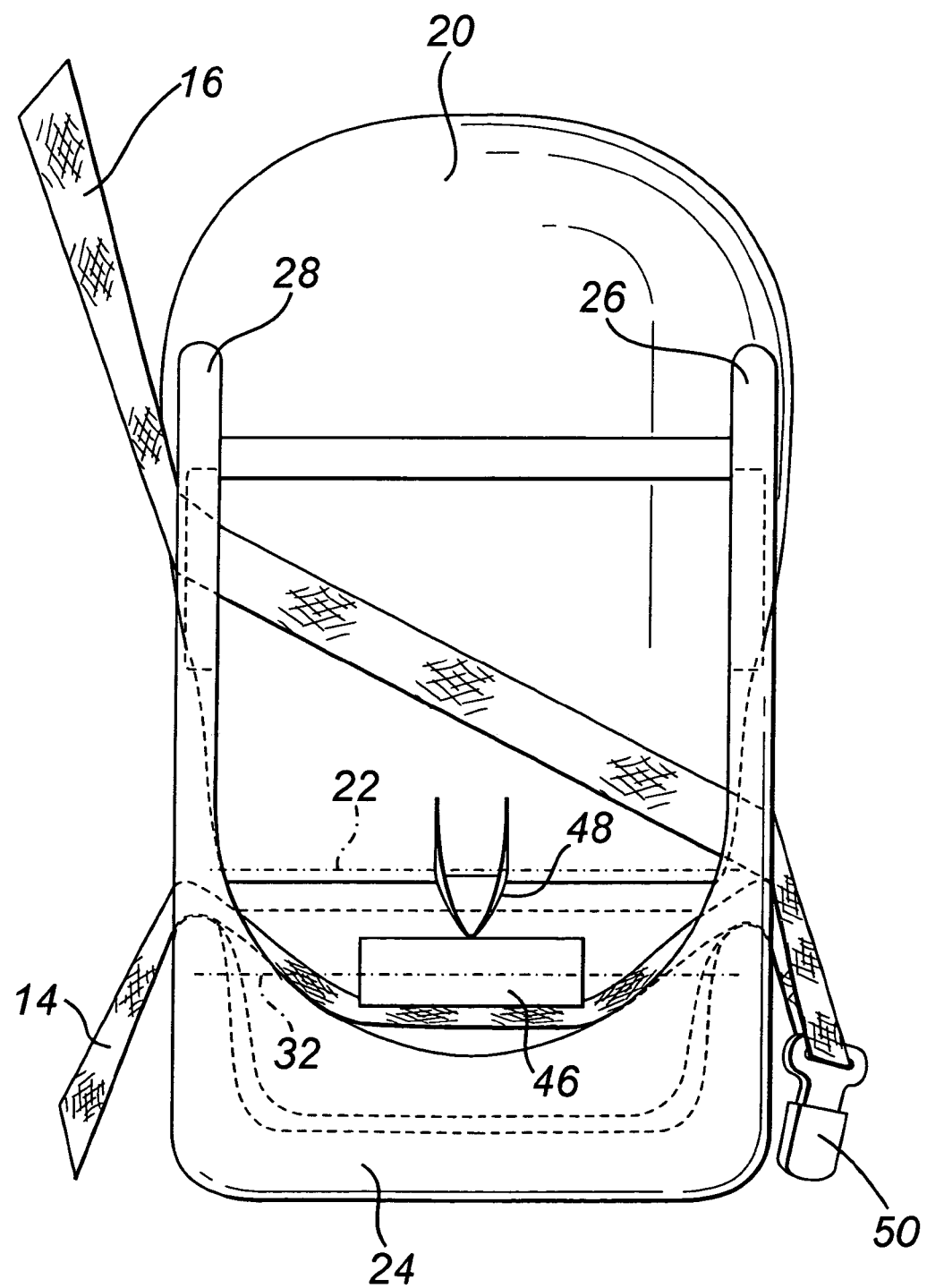
FIG. 4 is a rear view of the seat shown in FIG. 1, with the strap deflecting means in its engaged position.

After the child safety seat has been positioned on the adult seat the adult belt has been passed over the based member and buckled as shown in FIGS. 1 and 2, the clamp 44 is secured so as to prevent slack from the shoulder strap 16 from feeding through the seat belt buckle 50 to the lap strap 14. Next, the child support back 20 is pivoted rearwardly so that the projection 48 engages with the radially outer end of the strap deflector 46, causing it to pivot to the position shown in FIGS. 3 and 4, thus tightening the lap strap 14 by deflecting it from its direct path between the lap belt guides 34 and 36. The back 20 is retained in this position by engagement of hook formations 52 and 54 thereon with latches (not shown) on the L members 26 and 28.

Figure 5:
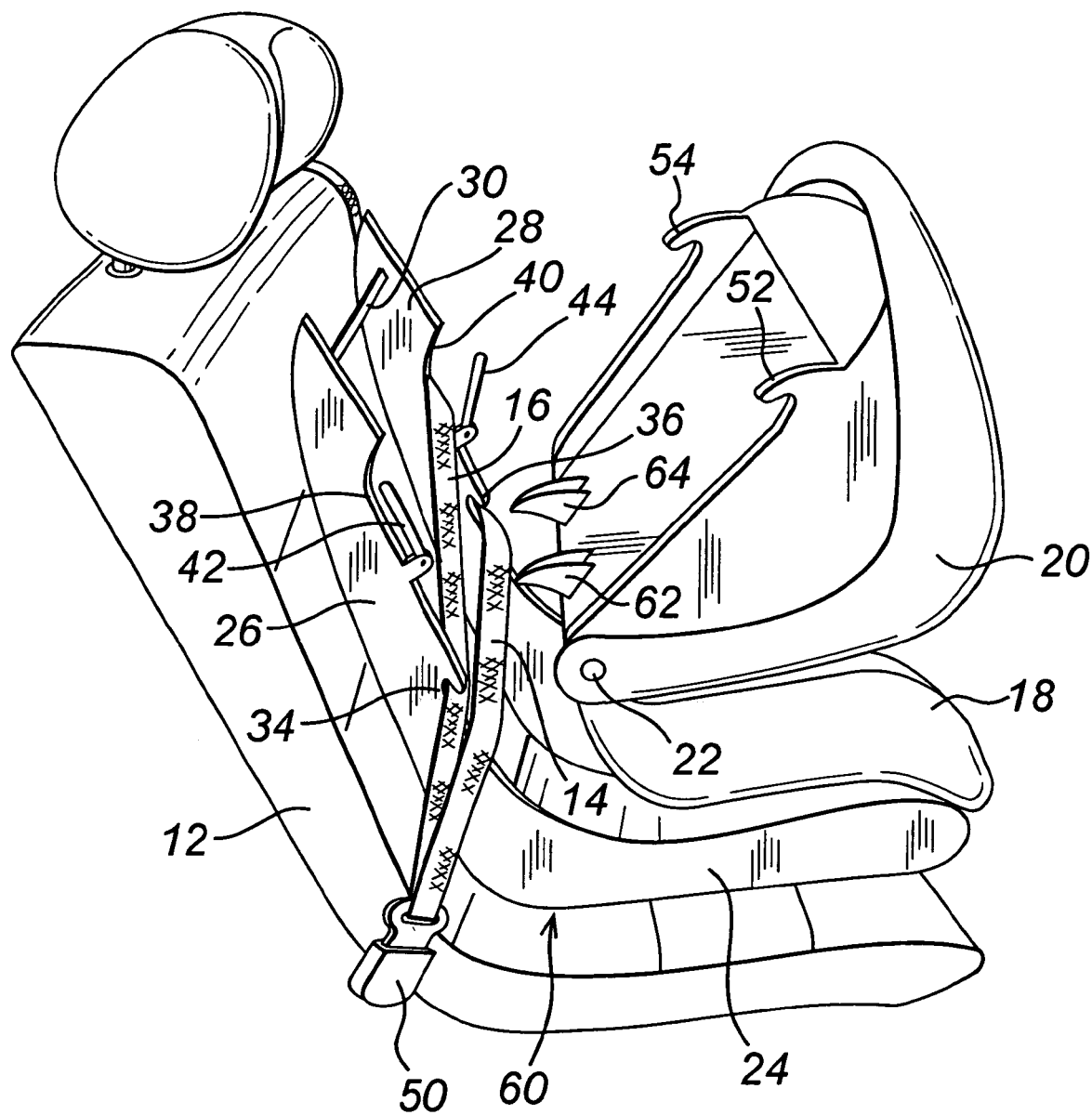
FIG. 5 is a perspective view from one side view, similar to FIG. 1, of a second child safety seat in accordance with the invention.
Figure 6:
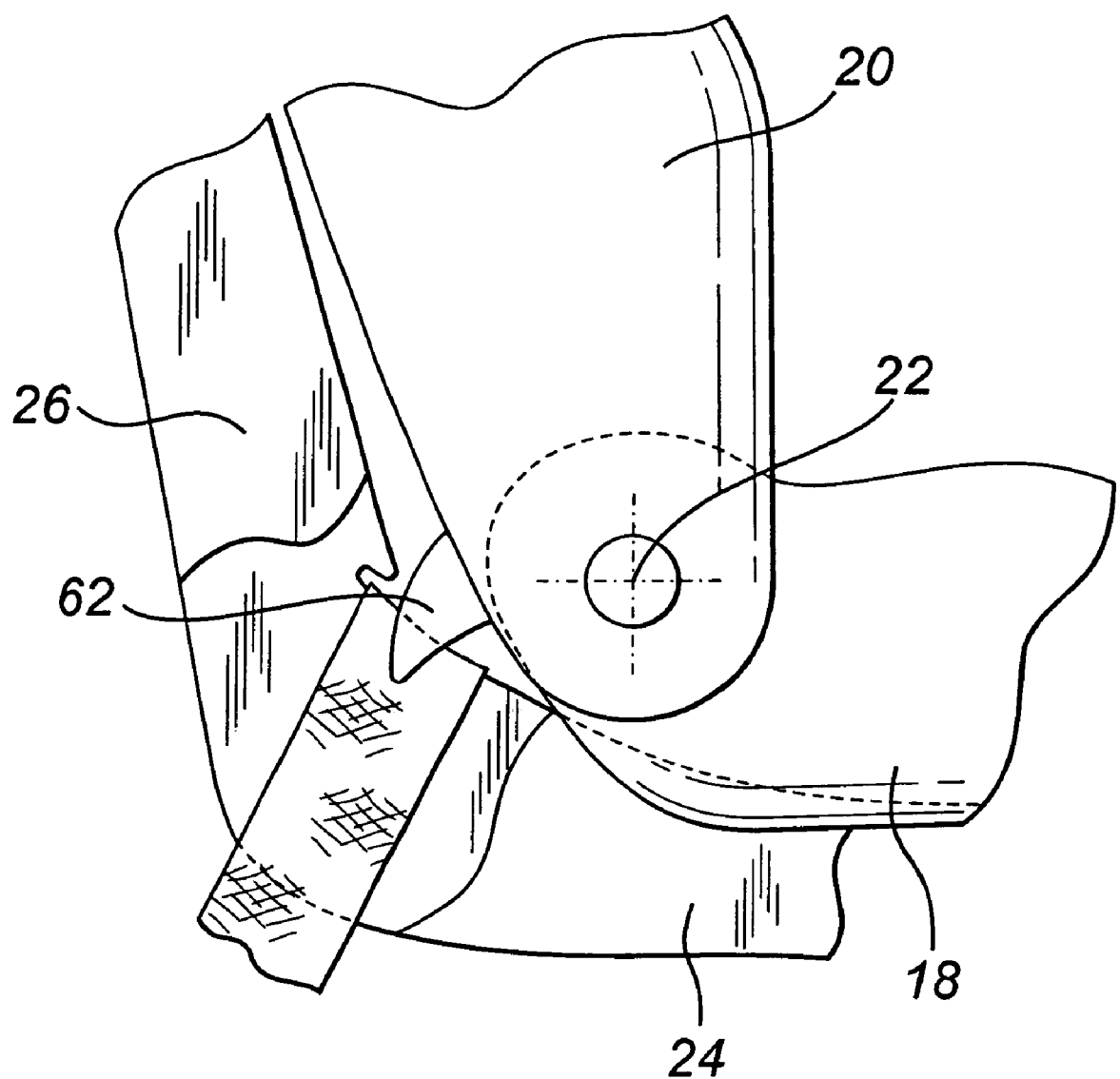
FIG. 6 is a fragmentary side view of the seat shown in FIG. 5, showing the strap deflecting means in its engaged position.
Figure 7:
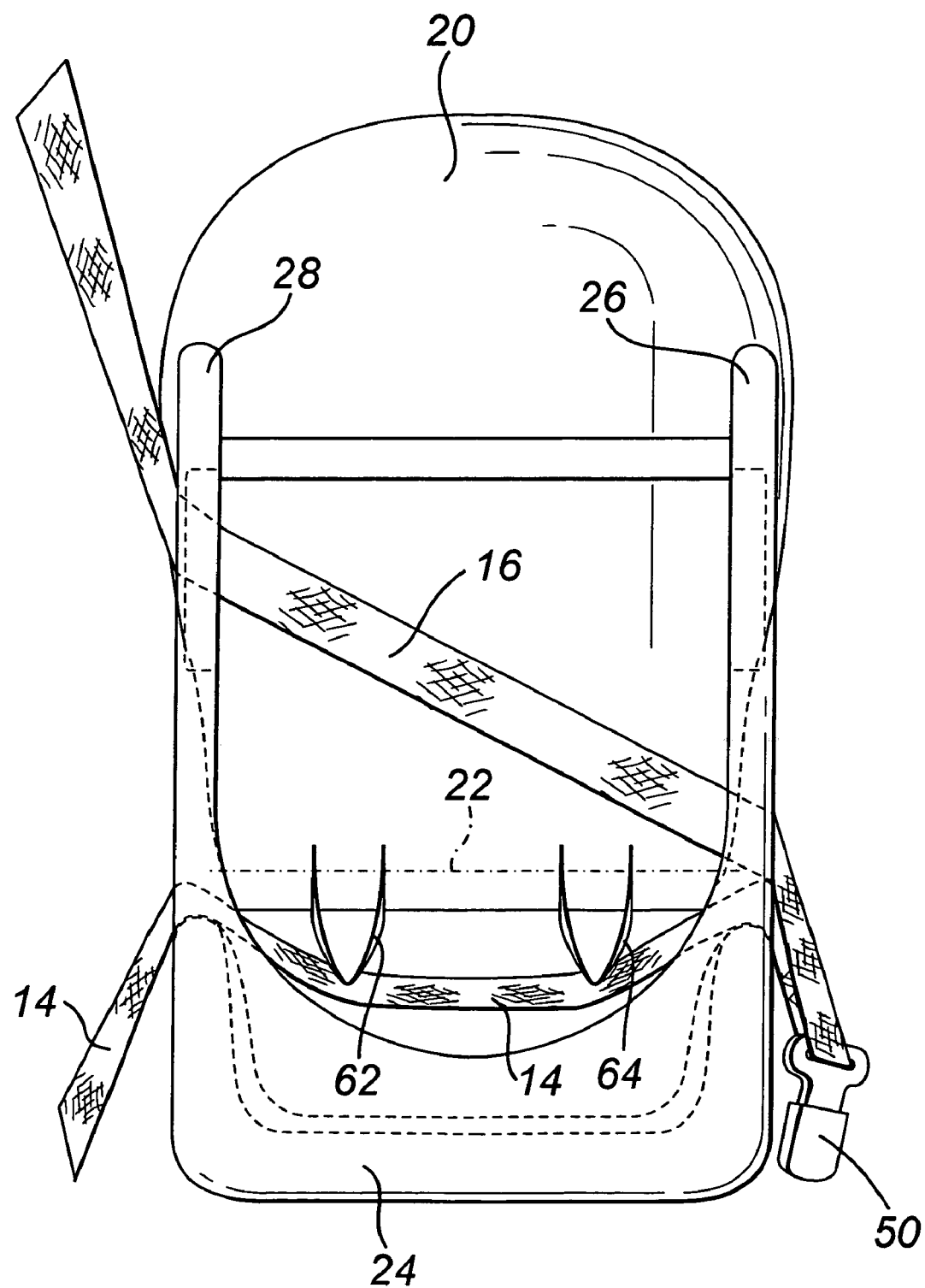
FIG. 7 is a rear view of the seat shown in FIGS. 5 and 6.

FIGS. 5 to 7 show another child safety seat 60 of the invention, most of the parts of which are identical with the corresponding parts of the seat 10 shown in FIGS. 1 to 4, are denoted by the same reference numerals and will not be described again in detail. However, there is no strap deflector 46. Instead, the single central projection 46 on the back of the child support back 20 is replaced by strap deflector projection means comprising two projections 62 and 64 spaced apart so that, when the support back 20 is moved from the position shown in FIG. 5 to the position shown in FIGS. 6 and 7, both projections 62 and 64 engage with the lap strap 14 between the two lap belt guides 34 and 36, thus tightening the lap strap 14 by deflecting it from its direct path between the lap belt guides 34 and 36. As before, the support back 20 is retained in this position by engagement of hook formations 52 and 54 thereon with latches (not shown) on the L members 26 and 28.

In an alternate arrangement of both embodiments described above, the child support back 20 is attached to be fixed to the base member 10 and the child support squab is pivotable about axis 22. With reference to FIGS. 1 and 5, such arrangements would involve rotating the illustrated embodiments counterclockwise and relocating the headrest and belt path for the shoulder portion 16 of the adult seat belt.

I claim:

1. A child safety seat for securing to a vehicle's adult seat by its adult seat belt, the child safety seat comprising:
   (a) a generally L shaped base member having a squab portion for resting on a squab of the adult seat, a back portion for abutting against a back of the adult seat, and guide means defining a strap path for the adult seat belt to secure the base member to the adult seat;
   (b) a child support having a child support squab for resting on said squab portion and a child support back for abutting against said back portion, wherein one of said child support squab or child support back is attached to be fixed to the base member while the other of said child support squab or child support back is pivotable, relative to the fixed one, between a folded position facilitating fitting of the adult seat belt into said strap path and a latched tightening position; and
   (c) latch means to latch the pivotable one of said child support squab or said child support back in said latched tightening position;
   the child support further comprising a strap deflector assembly provided on the pivotable one of said child support squab or said child support back whereby in the latched tightening position the strap deflector assembly deflects the adult seat belt from said strap path to tighten it.

2. A child safety seat according to claim 1 wherein the child support squab is fixed to the base member.

3. A child safety seat according to claim 1 wherein the child support back is fixed to the base member.

4. A child safety seat according to claim 2 wherein the child support back is pivotally attached to the child support squab.

5. A child safety seat according to claim 4 wherein the latch means is provided at a high position in the child support back and the back portion of the base.

6. A child safety seat according to claim 1 wherein the back portion of said base member comprises two upwardly extending side members and an upper bar interconnecting the side members; and wherein the guide means comprises a guide located on each side member.

7. A child safety seat according to claim 6 wherein the guide means comprise lap guides for the lap portion of said adult seat belt.

8. A child safety seat for securing to a vehicle's adult seat by its adult seat belt, the child safety seat comprising:
   (a) a generally L shape base member having a squab portion for resting on a squab of the adult seat, a back portion for abutting against a back of the adult seat, and guide means defining a strap path for the adult seat belt to secure the base member to the adult seat, and a strap deflector;
   (b) a child support having a child support squab for resting on said squab portion and a child support back for abutting against said back portion, wherein one of said child support squab or child support back is attached to be fixed to the base member while the other of said child support squab or child support back is pivotable, relative to the fixed one, between a folded position facilitating fitting of the adult seat belt into said strap path and a latched tightening position; and
   (c) latch means to latch the pivotable one of said child support squab or said child support back in said latched tightening position;
   the child support further comprising a projection provided on the pivotable one of said child support squab or said child support back whereby in the latched tightening position the projection acts on the strap deflector to deflect the adult seat belt from said strap path to tighten it.

9. A child safety seat according to claim 8 wherein the child support squab is fixed to the base member.

10. A child safety seat according to claim 8 wherein the child support back is fixed to the base member.

11. A child safety seat according to claim 9 wherein the child support back is pivotally attached to the child support squab.

12. A child safety seat according to claim 11 wherein the latch means is provided at a high position in the child support back and the back portion of the base.

13. A child safety seat according to claim 8 wherein the back portion of said base member comprises two upwardly extending side members and an upper bar interconnecting the side members; and wherein the guide means comprises a guide located on each side member.

14. A child safety seat according to claim 13 wherein the guide means comprise lap guides for the lap portion of said adult seat belt.

* * * * *